United States Patent
Maker et al.

(10) Patent No.: US 12,015,238 B2
(45) Date of Patent: Jun. 18, 2024

(54) INJECTION-LOCKED LASER SYSTEM

(71) Applicant: M SQUARED LASERS LIMITED, Glasgow (GB)

(72) Inventors: Gareth Thomas Maker, Glasgow (GB); Graeme Peter Alexander Malcolm, Glasgow (GB); Stephen Webster, Glasgow (GB)

(73) Assignee: M SQUARED LASERS LIMITED, Glasgow (GB)

( * ) Notice: Subject to any disclaimer, the term of this patent is extended or adjusted under 35 U.S.C. 154(b) by 730 days.

(21) Appl. No.: 16/965,854

(22) PCT Filed: Jan. 30, 2019

(86) PCT No.: PCT/GB2019/050247
§ 371 (c)(1),
(2) Date: Jan. 30, 2019

(87) PCT Pub. No.: WO2019/150097
PCT Pub. Date: Aug. 8, 2019

(65) Prior Publication Data
US 2021/0036484 A1    Feb. 4, 2021

(30) Foreign Application Priority Data

Jan. 30, 2018  (GB) ..................... 1801533

(51) Int. Cl.
*H01S 3/23* (2006.01)
*H01S 3/081* (2006.01)
(Continued)

(52) U.S. Cl.
CPC .......... *H01S 3/2308* (2013.01); *H01S 3/0816* (2013.01); *H01S 3/10053* (2013.01);
(Continued)

(58) Field of Classification Search
CPC .. H01S 3/2308; H01S 3/0816; H01S 3/10053; H01S 3/1305; H01S 3/1307;
(Continued)

(56) References Cited

U.S. PATENT DOCUMENTS 4,635,246 A    1/1987  Taylor et al.
6,285,691 B1 *  9/2001  Kaneda ............... H01S 3/10092
                                                         372/18
(Continued)

FOREIGN PATENT DOCUMENTS

WO    WO2011/151818 A1    12/2011

OTHER PUBLICATIONS

International Search Report from PCT/GB2019/050247 dated Jun. 18, 2019.
(Continued)

*Primary Examiner* — Xinning(Tom) Niu
(74) *Attorney, Agent, or Firm* — FisherBroyles, LLP

(57) ABSTRACT

A method and system for injection-locking multiple optical amplifiers is disclosed. A master laser is employed to generate a continuous-wave output field. Optical modulators then produce first and second seed optical fields from the continuous-wave output field. The first and second seed optical fields provide an input to injection lock one or more optical amplifiers, optionally at different operating frequencies. Since the first and second seed optical fields are generated from the continuous-wave output field then the output fields of the optical amplifiers exhibit a high phase-coherence with each other and with the continuous-wave output field. Employing the first and second optical fields reduces the requirement to induce large frequency shifts on a single optical field. Techniques for phase-locking the output of the injection-locked laser systems are also provided to further reduce phase noise within the systems.

55 Claims, 5 Drawing Sheets

(51) Int. Cl.
- *H01S 3/10* (2006.01)
- *H01S 3/13* (2006.01)
- *H01S 3/137* (2006.01)
- *H01S 3/16* (2006.01)

(52) U.S. Cl.
CPC .......... *H01S 3/1305* (2013.01); *H01S 3/1307* (2013.01); *H01S 3/137* (2013.01); *H01S 3/1625* (2013.01); *H01S 3/1636* (2013.01); *H01S 3/2391* (2013.01)

(58) Field of Classification Search
CPC ...... H01S 3/137; H01S 3/1625; H01S 3/1636; H01S 3/2391; H01S 3/1003; H01S 3/10092; H01S 3/0092; H01S 3/139; H01S 3/2383
See application file for complete search history.

(56) References Cited

U.S. PATENT DOCUMENTS

| | | | |
|---|---|---|---|
| 6,400,871 B1 | 6/2002 | Minden | |
| 7,187,492 B1* | 3/2007 | Shay | H01S 3/2383 342/372 |
| 9,106,051 B1 | 8/2015 | Goodno et al. | |
| 2004/0101317 A1* | 5/2004 | Yap | H01S 5/4006 398/187 |
| 2004/0145801 A1 | 7/2004 | Rice et al. | |
| 2007/0086010 A1* | 4/2007 | Rothenberg | H01S 3/1301 356/450 |
| 2008/0037028 A1* | 2/2008 | Cheung | H01S 3/2383 356/478 |
| 2009/0134310 A1* | 5/2009 | Goodno | H01S 3/2308 250/201.9 |
| 2011/0280581 A1 | 11/2011 | Chann et al. | |
| 2017/0294966 A1 | 10/2017 | Jia et al. | |

OTHER PUBLICATIONS

Kikuchi et al: "Amplitude-Modulation Sideband Injection Locking Characteristics of Semiconductor Lasers and Their Application", Journal of Lightwave Technology, IEEE, USA, vol. 6, No. 12, Dec. 1, 1988 (Dec. 1, 1988), pp. 1821-1830.

Klaus Ertel et al: "Injection-seeded pulsed Ti:sapphire laser with novel stabilization scheme and capability of dual-wavelength operation", Applied Optics, vol. 44, No. 24, Aug. 20, 2005 (Aug. 20, 2005), p. 5120.

\* cited by examiner

INJECTION-LOCKED LASER SYSTEM

This application is the U.S. National Stage of International Application No. PCT/GB2019/050247, which was filed on Jan. 30, 2019. This application also claims the benefit of the filing date of GB patent application No. 1801533.9, which was filed on Jan. 30, 2018. The contents of both of those applications are hereby incorporated by reference.

The present invention relates to the field of lasers and, in particular, to a continuous-wave (CW) injection-locked laser system.

Phase-locked laser systems are a known technique for actively phase matching two optical fields. However, these systems fail to provide a high degree of phase-coherence at high frequencies since such frequencies are beyond the frequency range at which active phase-control is feasible or easily achieved. Phase-locked laser systems also suffer from the effects of a "servo-bump" i.e. an amplification of phase-noise just beyond the frequency range of the active control system.

An alternative technique for phase matching two optical fields are those based on injection-locking. Injection-locking techniques are applied mainly to continuous-wave single-frequency laser sources. It is achieved by employing a low power laser with desirable frequency properties (the master laser) to impose its frequency onto a higher power laser (the slave laser) whose spectral properties would otherwise not be as good. Injection-locking is required because such low-noise performance, or even just single-frequency operation, is significantly more difficult to achieve in high-power lasers, because these lasers tend to be more susceptible to mechanical vibrations, cannot utilise very low-noise pump sources, and are subject to significant thermal influences.

Injection-locking is achieved by injecting the output of the master laser into the cavity of the slave laser. As the frequency of the master laser approaches one of the axial mode frequencies of the slave laser, light from the master laser is regeneratively amplified to higher intensities, eventually saturating the gain in the slave laser to such an extent that the original free-running mode of the slave laser is extinguished. Within this locking-range, the output of the slave laser is phase locked to the phase of the output of the master laser. Injection-locking offers the advantage of single-frequency operation of a high-power laser without the use of etalons or other intracavity elements that would reduce the power efficiency, and which are often unable to tolerate the desired high power levels.

U.S. Pat. No. 5,027,360 discloses a high-power injection-locked laser system that comprises a master and a slave laser, both of which are solid state lasers having continuous wave outputs. In the disclosed system the slave laser has an output power at least ten times greater than the master laser. The system further comprises a servo-loop control system employed to maintain the injection-locked condition. This is achieved by generating an error signal that is indicative of fluctuations within the slave laser cavity and employing this error signal to adjust the length of the slave laser cavity to maintain the locked condition.

Frequency modulated lasers and mode-locked lasers have also been employed as the master laser to simultaneously injection-lock two or more slave lasers, see for example US patent numbers U.S. Pat. Nos. 4,635,246 and 5,379,309. In these systems different optical modes of the mode-locked master laser are employed to injection-lock independent laser oscillators. As a result, injection locking of two or more slave lasers resonant at operating frequencies of:

$$f = f_0 \pm n\Delta f \qquad (1)$$

where
$f_0$ is the central operating frequency of the master laser
n is an integer; and
$\Delta f$ is the frequency difference between the adjacent modes of the master laser has been achieved. Since the phase fluctuations of the modes of the master laser are highly correlated then the phase fluctuations of the output of the two or more slave lasers are similarly highly correlated.

Although the above described injection-locking techniques result in the output of the slave lasers having a highly matched phase with the output of the master laser, in practice this phase matching is not perfect. Imperfect following of the slave lasers means that there is still some residual phase noise, particularly at low frequencies. In addition, phase noise can be introduced during the transmission of the optical fields on the injection locked systems.

SUMMARY OF INVENTION

It is therefore an object of an embodiment of the present invention to obviate or at least mitigate the foregoing disadvantages of the injection-locked laser system known in the art.

It is a further object of an embodiment of the present invention to provide an injection-locked laser system wherein a continuous wave master laser is employed to simultaneously injection lock two or more slave lasers.

A yet further object of an embodiment of the present invention is to provide an injection-locked laser system which exhibits reduced phase noise when compared with those injection-locked laser systems known in the art.

According to a first aspect of the present invention there is provided an injection-locked laser system comprising: a master laser that generates a continuous-wave output field having a frequency ($f_0$);
  one or more optical modulators employed to produce from the continuous-wave output field a first seed optical field having a first frequency ($f_1$) and a second seed optical field having a second frequency ($f_2$)
  wherein the first seed optical field provides an input to injection lock one or more optical amplifiers at the first frequency ($f_1$) and the second seed optical field provides an input to injection lock one or more optical amplifiers at the second frequency ($f_2$).

Since the first seed optical field and the second seed optical field are produced from the continuous-wave output field of the master laser then the output fields of the one or more optical amplifiers also exhibit a high phase-coherence with each other and the continuous-wave output field. This arrangement also ensures that any noise introduced by the master laser is common to the one or more optical amplifiers injection locked by the first and second seed optical fields.

Optionally the injection-locked laser system comprises N optical modulators employed to produce from the continuous-wave output field N seed optical fields having a frequency ($f_N$) The first frequency ($f_1$) preferably equals the frequency of the continuous-wave output field ($f_0$) plus a modulation frequency ($\Delta f_1$) introduced by the one or more optical modulators. Preferably the second frequency ($f_2$) equals the frequency of the continuous-wave output field ($f_0$) minus the modulation frequency ($\Delta f_2$) introduced by the one or more optical modulators. The use of positive and negative frequency shifts means that a relative frequency offset of $\Delta f_1 + \Delta f_2$ can be achieved by imparting a first frequency shift onto the output fields the one or more optical amplifiers injection locked by the first optical seed field and a second frequency shift onto the output fields the one or more optical amplifiers injection locked by the second optical seed field.

Preferably the modulation frequency ($\Delta f$) introduced by the one or more optical modulator is between 0.1 and 40 GHz. Preferably the modulation frequency ($\Delta f$) introduced by the one or more optical modulator is around 6 GHz.

Preferably the one or more optical modulators comprises an electro-optic modulator (EOM). Alternatively, the one or more optical modulators comprises an acoustic-optic modulator (AOM).

Preferably the first seed optical field is mode-matched with the one or more optical amplifiers injection locked by the first seed optical field. In a similar manner, it is preferable for the second seed optical field to be mode-matched with the one or more optical amplifiers injection locked by the second seed optical field.

Most preferably the injection-locked laser system further comprises one or more frequency lock control loops to frequency lock one or more of the optical amplifiers to the first seed field.

Most preferably the injection-locked laser system further comprises one or more frequency lock control loops to frequency lock one or more of the optical amplifiers to the second seed field.

Most preferably the injection-locked laser system further comprises a first phase lock control loop that provides a feedback signal to one of the one or more optical modulators that allows for an output field of a first optical amplifier to be phase locked to the first seed optical field.

Most preferably the first phase lock control loop comprises a first detector arranged to generate a first electrical beat signal from a first optical beat signal generated from the combined output field of the first optical amplifier and the continuous-wave output field.

The first phase lock control loop may further comprise a reference oscillator employed to generate a first reference signal a having a frequency equal to a frequency of the first electrical beat signal.

Most preferably the first phase lock control loop further comprises a first frequency mixer employed to generate a first error signal from the first electrical beat signal and the first reference signal.

Preferably the first phase lock control loop further comprises a first voltage-controlled oscillator a control signal for which is generated from the first error signal. Preferably an output signal from the first voltage-controlled oscillator provides the feedback signal for the first optical modulator. Optionally the first phase lock control loop further comprises a first frequency synthesiser located between the first voltage-controlled oscillator and the first optical modulator.

Alternatively, the first phase lock control loop further comprises a first voltage-controlled phase shifter a control signal for which is generated from the first error signal. Preferably an input signal for the first voltage-controlled phase shifter is generated by a first fixed frequency oscillator. Optionally the first phase lock control loop further comprises a first frequency synthesiser located between the first voltage-controlled phase shifter and the first optical modulator. Alternatively, the first phase lock control loop further comprises a first frequency synthesiser located between the first fixed frequency oscillator and the first voltage-controlled phase shifter.

In a further alternative, the first phase lock control loop further comprises a first reference oscillator employed to generate a first reference signal a having a first frequency $f_A$. The first phase lock control loop further comprises a first Direct Digital Synthesiser (DDS) employed to generate a second reference signal a having a second frequency $f_B$. Most preferably the first frequency $f_A$ equals the frequency of the first electrical beat signal minus the second frequency $f_B$.

Most preferably the first phase lock control loop further comprises a first frequency mixer employed to generate a first intermediate frequency signal from the first electrical beat signal and the first reference signal $f_A$.

Most preferably the first phase lock control loop further comprises a second frequency mixer employed to generate an error signal from the first intermediate frequency signal and the second reference signal $f_B$.

Preferably the first phase lock control loop further comprises a first voltage-controlled oscillator a control signal for which is generated from the first error signal.

Preferably the first Direct Digital Synthesiser (DDS) is further employed to generate an output signal.

Most preferably the first phase lock control loop further comprises a third frequency mixer employed to generate the feedback signal to one of the one or more optical modulators from an output signal from the first voltage-controlled oscillator and the output signal of the first DDS.

Most preferably the injection-locked laser system further comprises a second phase lock control loop that provides a feedback signal to one of the one or more optical modulators that allows for an output field of a second optical amplifier to be phase locked to the second seed optical field.

Most preferably the second phase lock control loop comprises a second detector arranged to generate a second electrical beat signal from a second optical beat signal generated from the combined output field of the second optical amplifier and the continuous-wave output field.

Preferably the reference oscillator is employed to generate a second reference signal having a frequency equal to a frequency of the second electrical beat signal.

Most preferably the second phase lock control loop further comprises a second frequency mixer employed to generate a second error signal from the second electrical beat signal and the second reference signal.

Preferably the second phase lock control loop further comprises a second voltage-controlled oscillator a drive signal for which is generated from the second error signal. Preferably an output signal from the second voltage-controlled oscillator provides the feedback signal for the second optical modulator. Optionally the second phase lock control loop further comprises a second frequency synthesiser located between the second voltage-controlled oscillator and the second optical modulator.

Alternatively, the second phase lock control loop further comprises a second voltage-controlled phase shifter a control signal for which is generated from the second error signal. Preferably an input signal for the second voltage-controlled phase shifter is generated by a second fixed frequency oscillator. Optionally the second phase lock control loop further comprises a second frequency synthesiser located between the second voltage-controlled phase shifter and the second optical modulator. Alternatively, the second phase lock control loop further comprises a second frequency synthesiser located between the second fixed frequency oscillator and the second voltage-controlled phase shifter.

In a further alternative, the second phase lock control loop further comprises a second reference oscillator employed to generate a third reference signal a having a third frequency $f_C$. The second phase lock control loop further comprises a second Direct Digital Synthesiser (DDS) employed to generate a fourth reference signal a having a fourth frequency $f_D$. Most preferably the third frequency $f_C$ equals the frequency of the second electrical beat signal minus the fourth frequency $f_D$.

Most preferably the second phase lock control loop further comprises a fourth frequency mixer employed to generate a second intermediate frequency signal from the second electrical beat signal and the third reference signal $f_C$.

Most preferably the second phase lock control loop further comprises a fifth frequency mixer employed to generate a second error signal from the second intermediate frequency signal and the fourth reference signal $f_D$.

Preferably the second phase lock control loop further comprises a second voltage-controlled oscillator a control signal for which is generated from the second error signal.

Preferably the second Direct Digital Synthesiser (DDS) is further employed to generate an output signal.

Most preferably the second phase lock control loop further comprises a sixth frequency mixer employed to generate the feedback signal to one of the one or more optical modulators from an output signal from the second voltage-controlled oscillator and the output signal of the second DDS.

Preferably the injection-locked laser system further comprises one or more optical isolators located between the master laser and the one or more optical amplifiers.

Optionally the injection-locked laser system further comprises one or more frequency doubling stages arranged to frequency double the one or more of the output fields the one or more optical amplifiers and or a component of the continuous-wave output field. In this embodiment it is preferable for the first and or second optical beat signals to be generated after one or more frequency doubling stages.

According to a second aspect of the present invention there is provided a method for injection-locking two or more optical amplifiers the method comprising:
  generating a continuous-wave output field having a frequency ($f_0$);
  optically modulating the continuous-wave output field to produce a first seed optical field having a first frequency ($f_1$) and a second seed optical field having a second frequency ($f_2$);
  employing the first seed optical field to injection lock one or more optical amplifiers at the first frequency ($f_1$); and
  employing the second seed optical field to injection lock one or more optical amplifiers at the second frequency ($f_2$).

Preferably the method for injection-locking two or more optical amplifiers further comprises mode-matching the first seed optical field with the one or more optical amplifiers injection locked by the first seed field. In a similar manner, the method for injection-locking two or more optical amplifiers further comprises mode-matching the second seed optical field with the one or more optical amplifiers injection locked by the second seed field.

Most preferably the method for injection-locking two or more optical amplifiers further comprises frequency locking one or more of the optical amplifiers to the first seed field.

Most preferably the method for injection-locking two or more optical amplifiers further comprises frequency locking one or more of the optical amplifiers to the second seed field.

Most preferably the method for injection-locking two or more optical amplifiers further comprises generating a first feedback signal to the optically modulated continuous-wave output field to phase lock an output field of one of the optical amplifiers to the first seed optical field.

Most preferably generating the first feedback signal comprises generating a first optical beat signal from the combined output field of one of the optical amplifier and the continuous-wave output field.

Generating the first feedback signal preferably further comprises generating a first electrical beat signal from the first optical beat signal.

Generating the first feedback signal preferably further comprises generating a first reference signal having a frequency equal to a frequency of the first electrical beat signal.

Preferably generation of the first feedback signal further comprises generating a first error signal from the first electrical beat signal and the reference signal.

Preferably generation of the first feedback signal further comprises employing the first error signal to generate a control signal for a first voltage-controlled oscillator. Preferably an output signal from the first voltage-controlled oscillator provides the first feedback signal for the optical modulator. Optionally the frequency of the first feedback signal is multiplied before arriving at the optical modulator.

Alternatively, generation of the first feedback signal further comprises employing the first error signal to generate a control signal for a first voltage-controlled phase shifter. Most preferably a first fixed oscillator provides an input signal for the first voltage-controlled phase shifter. Preferably an output signal from the first voltage-controlled phase shifter provides the feedback signal for the optical modulator. Optionally the frequency of the feedback signal is multiplied before arriving at the optical modulator. Alternatively, the frequency of the input signal is multiplied before arriving at the first voltage-controlled phase shifter.

In a further alternative, generating the first feedback signal preferably further comprises generating a first reference signal having a frequency $f_A$.

Generating the first feedback signal preferably further comprises generating a second reference signal having a frequency $f_B$ Most preferably the first frequency $f_A$ equals the frequency of the first electrical beat signal minus the second frequency $f_B$.

Generating the first feedback signal preferably further comprises generating a first intermediate frequency signal from the first electrical beat signal and the first reference signal $f_A$.

Most preferably generating the first feedback signal preferably further comprises generating an error signal from the first intermediate frequency signal and the second reference signal $f_B$.

Preferably generating the first feedback signal preferably further comprises generating a control signal for a first voltage-controlled oscillator from the first error signal.

Most preferably generating the first feedback signal preferably further comprises frequency mixing an output signal from the first voltage-controlled oscillator and an output signal from a first DDS.

Most preferably the method for injection-locking two or more optical amplifiers further comprises generating a second feedback signal to the optically modulated continuous-wave output field to phase lock an output field of one of the optical amplifiers to the second seed optical field.

Most preferably generating the second feedback signal comprises generating a second optical beat signal from the combined output field of one of the optical amplifiers and the continuous-wave output field.

Generating the second feedback signal preferably further comprises generating a second electrical beat signal from the second optical beat signal.

Generating the second feedback signal preferably further comprises generating a second reference signal having a frequency equal to a frequency of the second electrical beat signal.

Preferably generating the second feedback signal further comprises generating a second error signal from the second electrical beat signal and the second reference signal.

Preferably generating the second feedback signal further comprises employing the second error signal to generate a control signal for a second voltage-controlled oscillator. Preferably an output signal from the second voltage-controlled oscillator provides the second feedback signal for the optical modulator. Optionally the frequency of the second feedback signal is multiplied before arriving at the optical modulator.

Alternatively, generating the second feedback signal further comprises employing the second error signal to generate a control signal for a second voltage-controlled phase shifter. Most preferably a second fixed oscillator provides an input signal for the second voltage-controlled phase shifter. Preferably an output signal from the second voltage-controlled phase shifter provides the feedback signal for the optical modulator. Optionally the frequency of the feedback signal is multiplied before arriving at the optical modulator. Alternatively, the frequency of the input signal is multiplied before arriving at the second voltage-controlled phase shifter.

In a further alternative, generating the second feedback signal preferably further comprises generating a third reference signal having a frequency $f_C$.

Generating the second feedback signal preferably further comprises generating a fourth reference signal having a frequency $f_D$. Most preferably the third frequency $f_C$ equals the frequency of the second electrical beat signal minus the fourth frequency $f_D$.

Generating the second feedback signal preferably further comprises generating a second intermediate frequency signal from the second electrical beat signal and the third reference signal $f_C$.

Most preferably generating the second feedback signal preferably further comprises generating an error signal from the second intermediate frequency signal and the fourth reference signal $f_C$.

Preferably generating the second feedback signal preferably further comprises generating a control signal for a second voltage-controlled oscillator from the second error signal.

Most preferably generating the second feedback signal preferably further comprises frequency mixing an output signal from the second voltage-controlled oscillator and an output signal from a second DDS.

Preferably the method for injection-locking two or more optical amplifiers further comprises optically isolating the continuous-wave output field from the one or more optical amplifiers.

Preferably the method for injection-locking two or more optical amplifiers further comprises frequency doubling one or more of the output fields the one or more optical amplifiers and or a component of the continuous-wave output field. In this embodiment it is preferable to generate the first and or second optical beat signals after frequency doubling the one or more of the output fields of the one or more optical amplifiers and or a component of the continuous-wave output field.

Embodiments of the second aspect of the present invention may comprise features to implement the preferred or optional features of the first aspect of the present invention or vice versa.

According to a third aspect of the present invention there is provided an injection-locked laser system comprising: a master laser that generates a continuous-wave output field having a frequency ($f_0$) and a first optical modulator employed to produce from the continuous-wave output field a first seed optical field having a first frequency ($f_1$), the first seed optical field providing an input to injection lock a first optical amplifier at the first frequency ($f_1$) wherein the injection-locked laser system further comprises a first phase lock control loop that provides a feedback signal to the first optical modulator that allows for an output field of the first optical amplifier to be phase locked to the first seed optical field.

Preferably the injection-locked laser system further comprises a second optical modulator employed to produce from the continuous-wave output field a second seed optical field having a second frequency ($f_2$). The second seed optical field may provide an input to injection lock a second optical amplifier at the second frequency ($f_2$). In this embodiment the injection-locked laser system may further comprise a second phase lock control loop that provides a feedback signal to the second optical modulator that allows for an output field of the second optical amplifier to be phase locked to the second seed optical field.

Preferably the first seed optical field is mode-matched with the first optical amplifier injection locked by the first seed optical field. In a similar manner, it is preferable for the second seed optical field to be mode-matched with the second optical amplifier injection locked by the second seed optical field.

Most preferably the injection-locked laser system further comprises one or more frequency lock control loops to frequency lock a resonance condition of the first optical amplifier to the first seed optical field.

Most preferably the injection-locked laser system further comprises one or more frequency lock control loops to frequency lock a resonance condition of the second optical amplifier to the second seed optical field.

Embodiments of the third aspect of the present invention may comprise features to implement the preferred or optional features of the first or second aspects of the present invention or vice versa.

According to a fourth aspect of the present invention there is provided a method for injection-locking an optical amplifier, the method comprising: generating a continuous-wave output field having a frequency ($f_0$);
   optically modulating the continuous-wave output field to produce a first seed optical field having a first frequency ($f_1$);
   employing the first seed optical field to injection lock a first optical amplifier at the first frequency ($f_1$); and
   generating a feedback signal for the first optical modulator to phase lock an output field of the first optical amplifier to the first seed optical field.

Embodiments of the fourth aspect of the present invention may comprise features to implement the preferred or optional features of the first to third aspects of the present invention or vice versa.

According to a fifth aspect of the present invention there is provided an injection-locked laser system comprising: a master laser that generates a continuous-wave output field having a frequency ($f_O$) and one or more optical modulators employed to produce from the continuous-wave output field one or more seed optical field having a frequency ($f_N$), the one or more seed optical field providing an input to injection lock one or more optical amplifiers at the frequency ($f_N$) wherein the injection-locked laser system further comprises one or more phase lock control loops that provide one or more feedback signals to the one or more optical modulators that allows for an output field of the one or more optical amplifiers to be phase locked to the one or more seed optical field.

Embodiments of the fifth aspect of the present invention may comprise features to implement the preferred or optional features of the first to fourth aspects of the present invention or vice versa.

According to a sixth aspect of the present invention there is provided a method for injection-locking one or more optical amplifiers, the method comprising:
  generating a continuous-wave output field having a frequency ($f_O$);
  optically modulating the continuous-wave output field to produce one or more seed optical fields having a first frequency ($f_N$);
  employing the one or more seed optical fields to injection lock one or more optical amplifier at one or more frequencies ($f_N$); and
  generating feedback signals for the one or more optical modulators to phase lock an output field of the one or more optical amplifiers to the one or more seed optical fields.

Embodiments of the sixth aspect of the present invention may comprise features to implement the preferred or optional features of the first to fifth aspects of the present invention or vice versa.

BRIEF DESCRIPTION OF DRAWINGS

There will now be described, by way of example only, various embodiments of the invention with reference to the drawings, of which.

Figure 1:
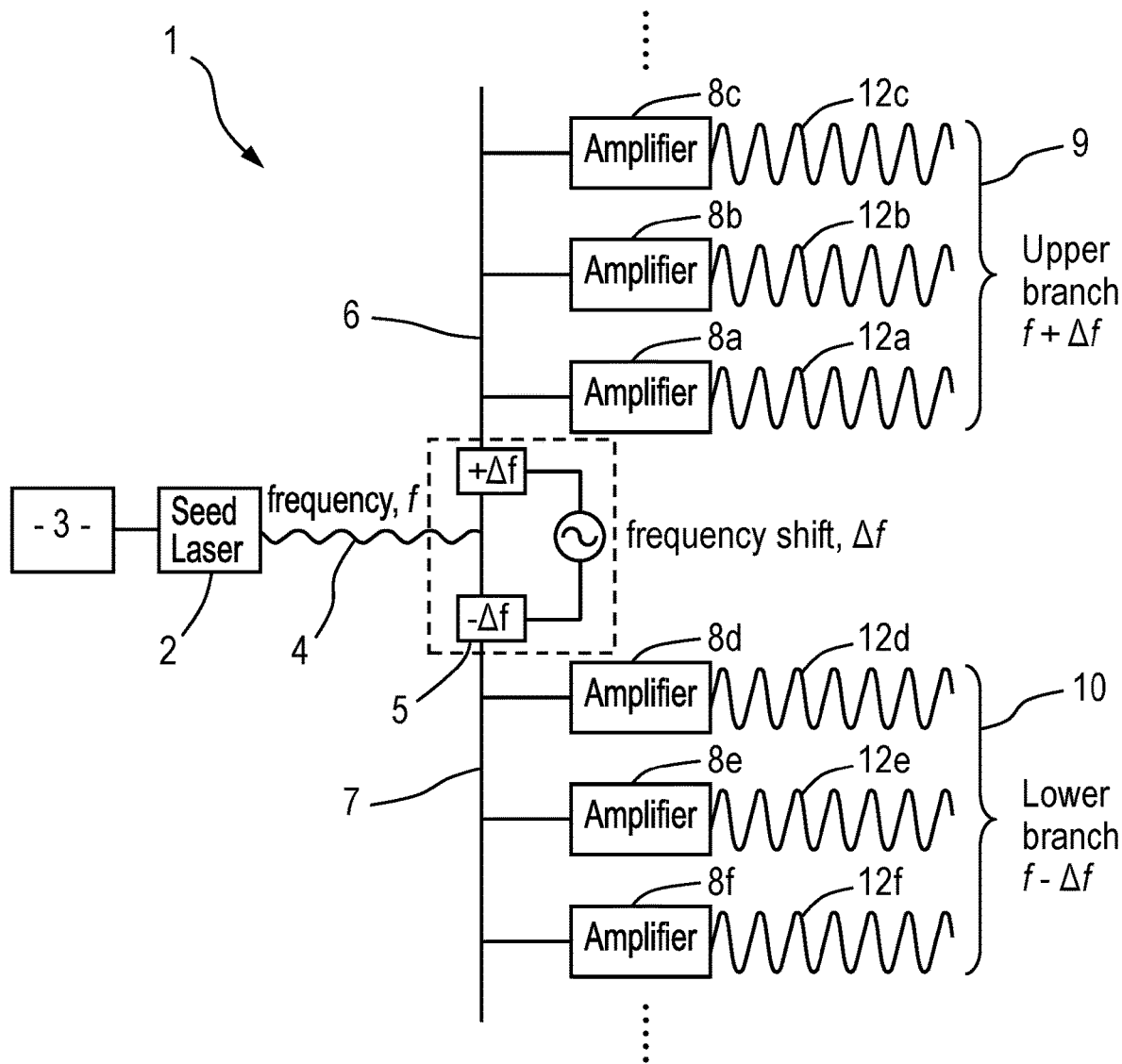
FIG. 1 presents a schematic representation of an injection-locked laser system in accordance with an embodiment of the present invention.

In the description which follows, like parts are marked throughout the specification and drawings with the same reference numerals. The drawings are not necessarily to scale and the proportions of certain parts have been exaggerated to better illustrate details and features of embodiments of the invention.

DETAILED DESCRIPTION

Details of an injection-locked laser system will now be described with reference to FIG. 1. In particular, FIG. 1 presents a schematic representation of an injection-locked laser system in accordance with a first embodiment of the present invention, as generally depicted by reference numeral 1.

The injection-locked laser system 1 can be seen to comprise a first Ti:sapphire laser 2 employed as the master (or seed) laser within the system 1. The master Ti:sapphire lasers 2 is optically pumped at 532 nm by a dedicated continuous wave diode-pumped solid-state (DPSS) laser source 3 to produce a continuous-wave output field 4. The applicant's proprietary SolsTiS® laser is a suitable example of a Ti:sapphire laser for use as the master laser 2 while the pump laser 3 may comprise a commercially available diode-pumped solid-state (DPSS) laser.

The pump laser 3 has the capability of providing up to 18 Watts of pump power to the master Ti:sapphire lasers 2. In the presently described embodiment, the pump laser 3 is arranged to provide ~6 W of pump power to the master Ti:sapphire lasers 2 to provide a tuneable continuous-wave output field 4 (tuneable between 700 nm and 1000 nm) with a power of around 1 W at 780 nm. With this arrangement the generated tuneable continuous-wave output field 4 operates at a single frequency ($f_0$), as a single transverse and longitudinal mode and exhibits low phase noise.

The continuous-wave output field 4 is then directed towards an optical modulator 5. The function of the optical modulator 5 is to produce first 6 and second 7 seed optical fields from the continuous-wave output field 4. The first seed optical field 6 has a frequency of:

$$f_1 = f_0 + \Delta f \quad (2)$$

while the second seed optical field 7 has a frequency of:

$$f_2 = f_0 - \Delta f \quad (2)$$

where $f_0$ is the operating frequency of the master Ti:sapphire lasers 2; and $\Delta f$ is the frequency shift induced by the optical modulator 5.

The optical modulator 5 may comprise one or more acousto-optic modulators (AOM). The positive shifted first seed optical field 6 and the negative shifted second seed optical field 7 preferably are generated by two independent AOM devices. However, in an alternative embodiment the optical modulator 5 may comprise a single AOM employed to generate the $\Delta f$ frequency shifted first 6 and second 7 seed optical fields; the sign of the $\Delta f$ frequency shift depending on the angle at which the continuous-wave output field 4 is incident upon the AOM.

In a further alternative embodiment, the optical modulator 5 may comprise an electro-optic modulator (EOM) set up for phase-modulation. The EOM may either be a free-space EOM or a waveguide EOM. In this embodiment, the optical modulator 5 effectively applies sidebands to the continuous-wave output field 4 at plus and minus the modulation frequency and it is these sidebands that are employed as the first 6 and second 7 seed optical fields.

The above described AOMs and EOMs allow for the optical modulator 5 to induce a frequency shift $\Delta f$ of between 0.1 to 40 GHz to the continuous-wave output field 4. For a frequency shift $\Delta f$ of around 6 GHz the resultant first seed optical field 6 and the second seed optical field 7 typically exhibit having powers of ~100 mW. Alternative injection locked laser systems developed by the applicant have employed frequency shifts $\Delta f$ of around 0.08 GHz, 1.6 GHz, 2.4 GHz and 4.0 GHz.

The first seed optical field 6 is then input into three optical amplifiers 8a, 8b and 8c (slave lasers) located within a first branch 9 of the injection-locked laser system 1. In a similar manner, the second seed optical field 7 is input into three optical amplifiers 8d, 8e and 8f (slave lasers) located within a second branch 10 of the injection-locked laser system 1.

Figure 2A:
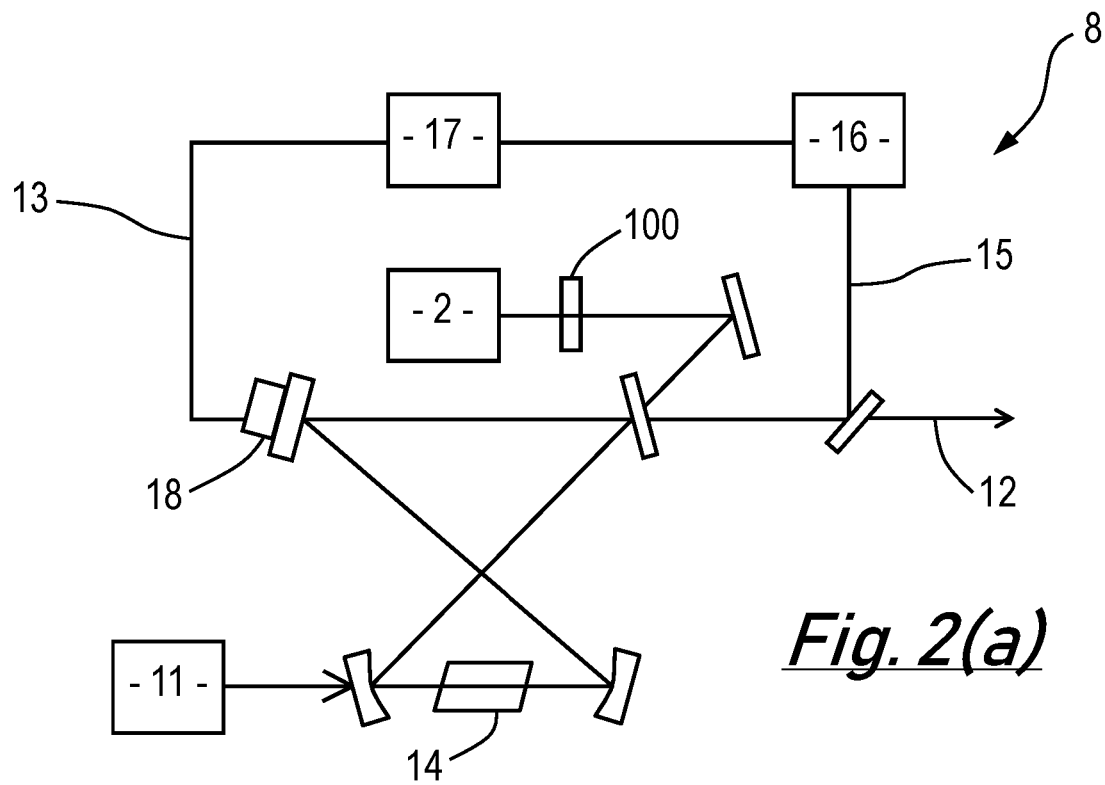
FIG. 2 presents a schematic representation of:
(a) an optical amplifier employed within the injection-locked laser systems of FIG. 1 and
(b) an alternative optical amplifier employed within the injection-locked laser systems of FIG. 1.

FIG. 2(a) presents a schematic representation of the optical amplifiers 8 employed within the injection-locked laser system 1. Each of the optical amplifiers 8 comprise a Ti:sapphire laser optically pumped at 532 nm by a dedicated continuous wave DPSS laser source 11 to produce a continuous-wave output field 12. The applicant's proprietary SolsTiS® laser is again a suitable example of a Ti:sapphire laser suitable for use as the optical amplifiers 8 (slave lasers). In the presently described embodiment the pump laser 11 is arranged to provide ~18 W of pump power to the slave Ti:sapphire lasers 8.

The cavities of the three optical amplifiers 8a, 8b and 8c (slave lasers) are arranged to be resonant at the frequency ($f_1$) of first seed optical field 6, namely $f_0+\Delta f$ while the cavities of the three optical amplifiers 8d, 8e and 8f (slave lasers) are arranged to be resonant at the frequency ($f_2$) of second seed optical field 7, namely $f_0-\Delta f$. Preferably the first seed optical field 6 is mode-matched with the cavities of the three optical amplifiers 8a, 8b and 8c. In a similar manner, it is preferable for the second seed optical field 7 to be mode-matched with the cavities of the three optical amplifiers 8d, 8e and 8f.

Since a fraction of the continuous-wave output field 4 of the master Ti:sapphire laser 2 is input into each optical amplifiers 8a, 8b, 8c, 8d, 8e and 8f (slave lasers) this acts as a "seed" within the associated optical amplifiers 8a, 8b, 8c, 8d, 8e or 8f (slave laser). This 'seed' results in stimulated emission within the optical amplifiers 8a, 8b, 8c, 8d, 8e or 8f (slave lasers) at the same frequency as the respective first seed optical field 6 or second seed optical field 7.

The output fields 12a, 12b, and 12c of the optical amplifiers 8a, 8b, and 8c are therefore an amplified version of the first seed optical field 6, having powers around 7.5 W and exhibiting a high phase-coherence with the first seed optical field 6 i.e. their frequency differences are in phase to <<1 cycle of the waveform. Similarly, the output fields 12d, 12d, and 12f of the optical amplifiers 8d, 8e and 8f are amplified versions of the second seed optical field 7, again having powers around 10 W and exhibiting a high phase-coherence with the second seed optical field 7 i.e. their frequency differences are in phase to <<1 cycle of the waveform.

Since the optical amplifiers 8a, 8b, 8c, 8d, 8e or 8f are all resonant devices, and as explained above, injection locking occurs when the seed fields 6 and 7 are in resonance with the cavities of their respective optical amplifiers 8a, 8b, 8c, 8d, 8e or 8f it is beneficial for the stable operation of the injection-locked laser system 1 to frequency lock the resonance condition of the optical amplifiers 8a, 8b, 8c, 8d, 8e or 8f to their respective seed fields 6 and 7.

In the embodiment presented in FIG. 2(a) a preferred frequency lock control loop 13 based on the Hänsch-Couillaud technique is employed to achieve the desired frequency locking. This technique was first described in Optics Communication Volume 35, Issue 3, pages 441 to 444 (1980) and exploits the fact that the Ti:sapphire crystals 14 of the optical amplifiers 8 are Brewster cut crystals. As a result, there exists an asymmetry in the two orthogonal polarisation components of the resonance frequency. A component 15 of the output field 12 is directed towards a polarisation analyser 16 then detects dispersion shaped resonances which can provide an error signal generated by locking electronics 17 for electronic frequency stabilisation via a piezo-mounted cavity mirror 18.

Figure 2B:
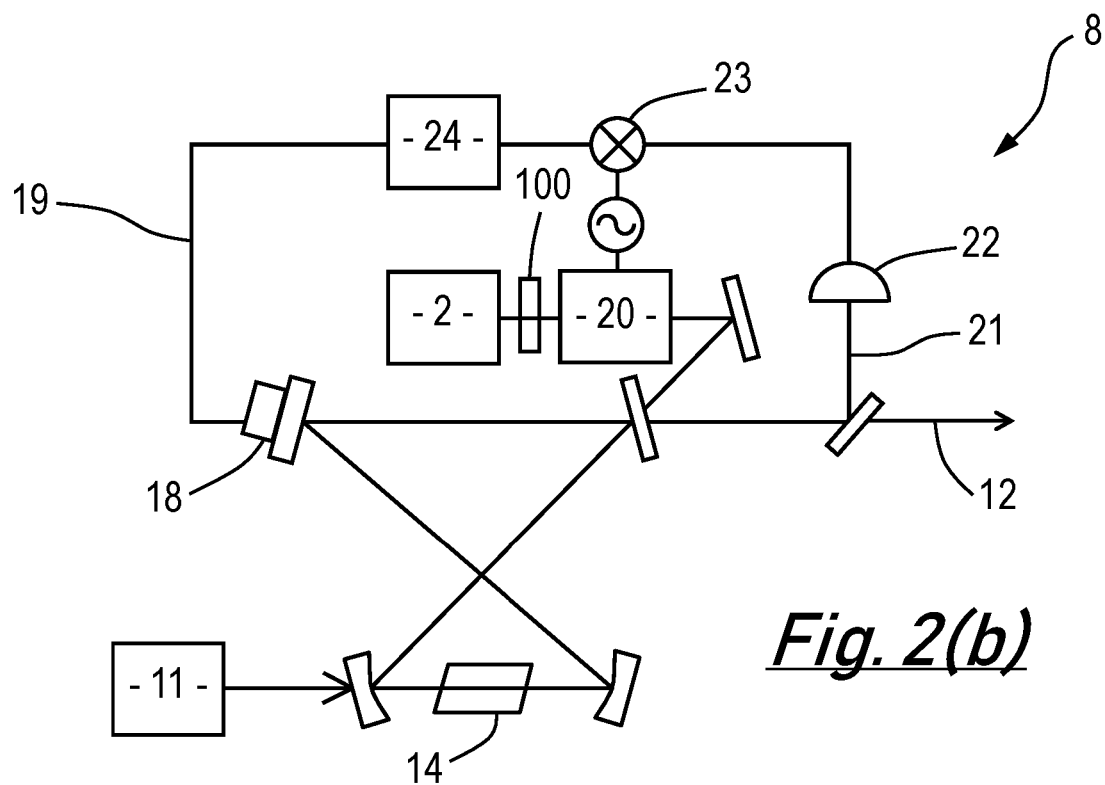

In an alternative embodiment presented in FIG. 2(b) a frequency lock control loop 19 based on the Pound-Drever-Hall technique is employed to achieve the desired frequency locking. This technique is described in Applied Physics. B, Volume 31, Pages 97 to 105 (1983) and is also the technique employed within U.S. Pat. No. 5,027,360. In this technique a frequency modulator 20 applies a frequency-modulation to the seed fields 6 and 7 is detected within a component 21 of the output field 12 by a photodiode 22. This frequency modulated signal is then demodulated by via a frequency mixer 23 to generate an error signal. Frequency locking electronics 24 then provide a correction signal for electronic frequency stabilisation via the piezo-mounted cavity mirror 18.

It will be appreciated that before injection locking has been achieved, the optical amplifier 8, not containing any internal element to force unidirectional operation, will operate bi-directionally, with half of its output power being directed back towards the master laser 2.

For this reason, it is necessary to employ an optical isolator 100 between the master laser 2 and the associated optical amplifier 8. Preferably the optical isolator 100 is capable of providing optical isolation of <–50 dB.

It should be noted that the above described frequency locking techniques of the optical amplifiers 8 do not themselves provide for phase-coherence between the seed fields 6 and 7 and the output fields 12a, 12b, 12c, 12d, 12e, and 12f. Instead, phase coherence is a direct result of the amplification process within the optical amplifiers 8. The frequency locking techniques merely ensures that the frequency of the resonance of the optical amplifiers 8 remains coincident with the frequency of their respective seed fields 6 and 7.

It will be appreciated that since the first seed optical field 6 and the second seed optical field 7 are produced from the continuous-wave output field 4 of the master Ti:sapphire laser 2 then the output fields 12a, 12b, 12c, 12d, 12e, and 12f of the optical amplifiers 8a, 8b, 8c, 8d, 8e and 8f also exhibit a high phase-coherence with each other and the continuous-wave output field 4.

A further advantage of the presently described the injection-locked laser system 1 is that the employment of a single frequency source, the master Ti:sapphire laser 2, to generate the positive and negative frequency shifts within the optical modulator 5 ensures that any noise introduced by the master Ti:sapphire laser 2 is common to both the first branch 9 and the second branch 10 of the injection-locked laser system 1.

The use of positive and negative frequency shifts means that the relative frequency offsets between the output fields 12a, 12b, and 12c of the first branch 9 and the output fields 12d, 12d, and 12f of the second branch 10 of $2\Delta f$ can be achieved by imparting half the frequency shift $+\Delta f$ on the first seed optical field 6 and the other half $-\Delta f$ on the second seed optical field 7. This is advantageous since imparting a large frequency shift $2\Delta f$ on a single optical field can present a significant technical challenge.

Although the embodiment of FIG. 1 presents a frequency shift of the same magnitude being imparted by the optical modulator 5 onto the first seed optical field 6 and the second seed optical field 7 this need not necessarily be the case.

Instead offsets of different magnitudes may by imparted onto the first 6 and the second 7 seed optical fields as long as the overall frequency offset, 2Δf, between the first seed optical field 6 and the second seed optical field 7 is maintained.

It will be appreciated that the number of optical amplifiers 8 located within the first 9 and second 10 branches of the injection-locked laser system 1 may also vary from the presently described embodiment i.e. there may be 1 to N optical amplifiers 8 in the first branch 9 and 1 to M optical amplifiers 8 in the second branch 10. In alternative embodiments, the number of optical amplifiers 8 located within the first 9 and second 10 branches of the injection-locked laser system 1 may not to be equal i.e. N≠M A schematic representation of an injection-locked laser system 25 in accordance with an alternative embodiment of the present invention will now be discussed with reference to FIG. 3.

The injection-locked laser system 25 can again be seen to comprise a first Ti:sapphire laser 2 employed as the master (or seed) laser within the system 25, that is optically pumped by a dedicated continuous wave diode-pumped solid-state (DPSS) laser source 3 to produce the continuous-wave output field 4.

The continuous-wave output field 4 is again split into a first seed optical field 6 and a second seed optical field 7. A fraction of the first seed optical field 6 is again input into each of the optical amplifiers 8a, 8b and 8c located within the first branch 9 of the injection-locked laser system 25. Similarly, a fraction of the second seed optical field 7 is again input into each of the optical amplifiers 8d, 8e and 8f located within the second branch 10 of the injection-locked laser system 25. It is again beneficial for the stable operation of the injection-locked laser system 25 to frequency lock the resonance condition of the optical amplifiers 8a, 8b, 8c, 8d, 8e or 8f to their respective seed fields 6 and 7, in a similar manner to that described above.

Figure 3:
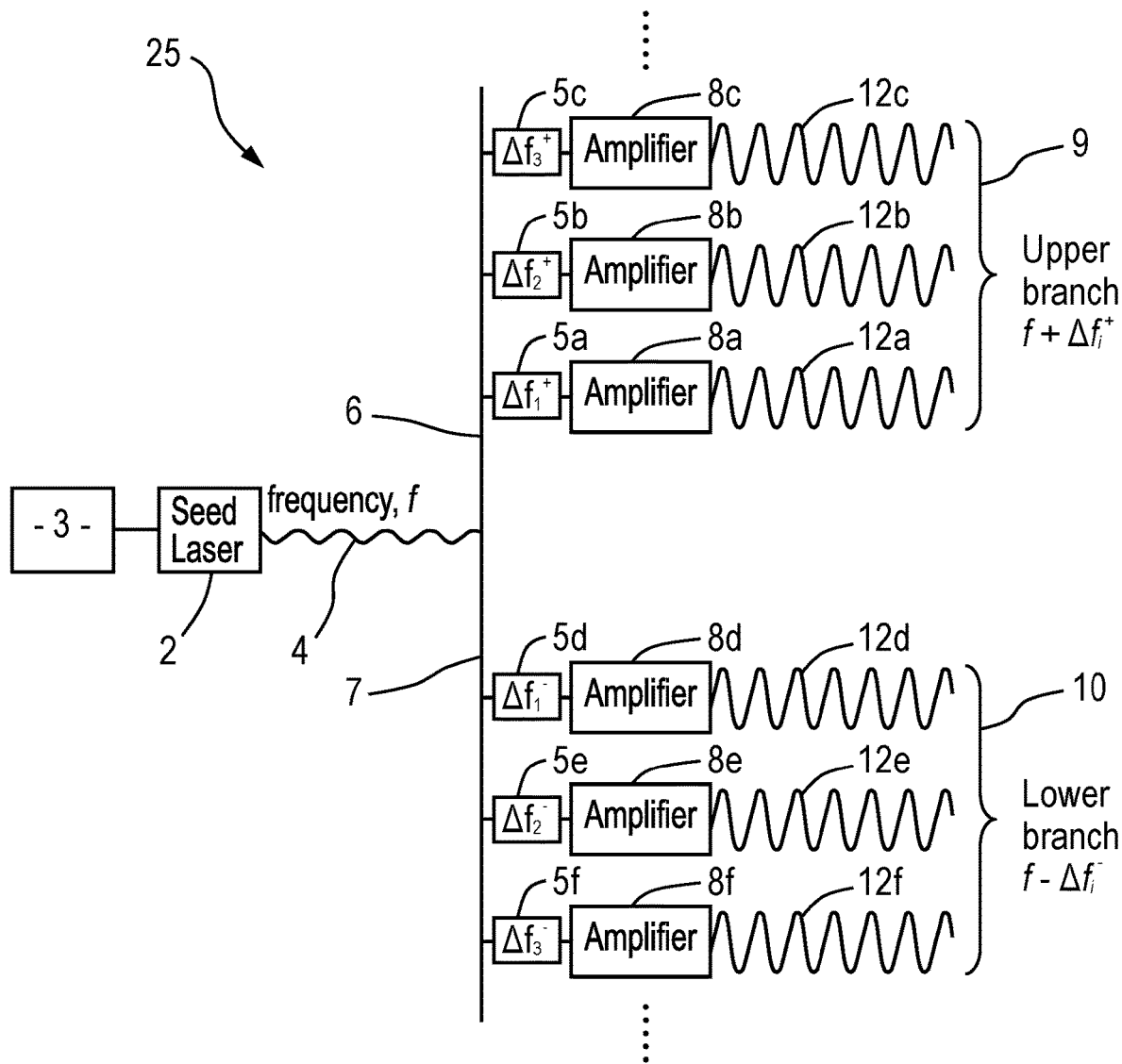
FIG. 3 presents a schematic representation of an injection-locked laser system in accordance with an alternative embodiment of the present invention.

The injection-locked laser system 25 of FIG. 3 differs from the injection-locked laser system 1 of FIG. 1 in that the optical amplifiers 8a, 8b, 8c, 8d, 8e and 8f have a dedicated optical modulator 5a, 5b, 5c, 5d, 5e and 5f employed to impart an independent and predetermined frequency shift $\Delta f_N$, where $\Delta f_N$ can have either sign, to the optical amplifiers 8a, 8b, 8c, 8d, 8e and 8f. It is preferable for the optical modulators 5a, 5b, 5c, 5d, 5e and 5f of the injection-locked laser system 25 of FIG. 3 to be EOMs. It is also preferable for the optical modulators 5a, 5b, 5c, 5d, 5e and 5f to share a common reference oscillator such that any noise introduced by the reference oscillator is common to each of the optical amplifiers 8a, 8b, 8c, 8d, 8e and 8f of the injection-locked laser system 25.

In the presently described embodiment, a frequency shift of $+\Delta f_1$, $+\Delta f_2$ and $+\Delta f_3$ is induced upon the fraction of first seed optical field 6 injected into the optical amplifiers 8a, 8b and 8c, respectively, located within the first branch 9 of the injection-locked laser system 25. In a similar manner, a frequency shift of $-\Delta f_1$, $-\Delta f_2$ and $-\Delta_3$ is induced upon the fraction of second seed optical field 7 injected into the optical amplifiers 8d, 8e and 8f, respectively, located within the second branch 10 of the injection-locked laser system 25.

It will however be appreciated that the frequency shifts induced upon the fraction of first seed optical field 6 injected into the optical amplifiers 8a, 8b and 8c and the frequency shifts induced upon the fraction of second seed optical field 7 injected into the optical amplifiers 8d, 8e and 8f may differ from the presently described embodiment such that each of the optical amplifiers 8a, 8b, 8c, 8d, 8e and 8f all resonate at a different frequencies.

The injection-locked laser system 25 provides the means to employ a different phase-shifts to each of the optical amplifiers 8a, 8b, 8c, 8d, 8e and 8f thus enabling unwanted resonances within the optical amplifiers 8a, 8b, 8c, 8d, 8e and 8f to be avoided. As will be appreciated by the skilled reader, multiple frequencies are present within the modulated continuous-wave output field 4 (carrier and sidebands). The cavities of the optical amplifiers 8a, 8b, 8c, 8d, 8e and 8f are resonant at regularly intervals in frequency. Therefore, for particular modulation frequencies, there will be an unwanted coincidence in resonance of more than one frequency, i.e. both carrier and sidebands can be resonant with cavities of the optical amplifiers 8a, 8b, 8c, 8d, 8e and 8f. However, it is only desired that the sideband is resonant with the respective cavities of the optical amplifiers 8a, 8b, 8c, 8d, 8e and 8f. By modifying the frequency shifts imparted upon the first seed optical field 6 and the second seed optical field 7 in the above manner, these coincidences can be avoided whilst maintaining the same frequency offset between the optical amplifiers 8a, 8b, 8c, 8d, 8e and 8f. For example, the frequency shift to the first seed optical field 6 may be increased to avoid the coincidence while the frequency shift to the second seed optical field 7 is reduced by the same amount to maintain the same overall offset 2Δf between these optical fields.

Being able to employ different phase-shifts to each of the optical amplifiers 8a, 8b, 8c, 8d, 8e and 8f also allows for novel phase locking and frequency chirp techniques to be incorporated, as will now be described in further detail below.

Phase Locked Injection-locked Laser System

Figure 4:
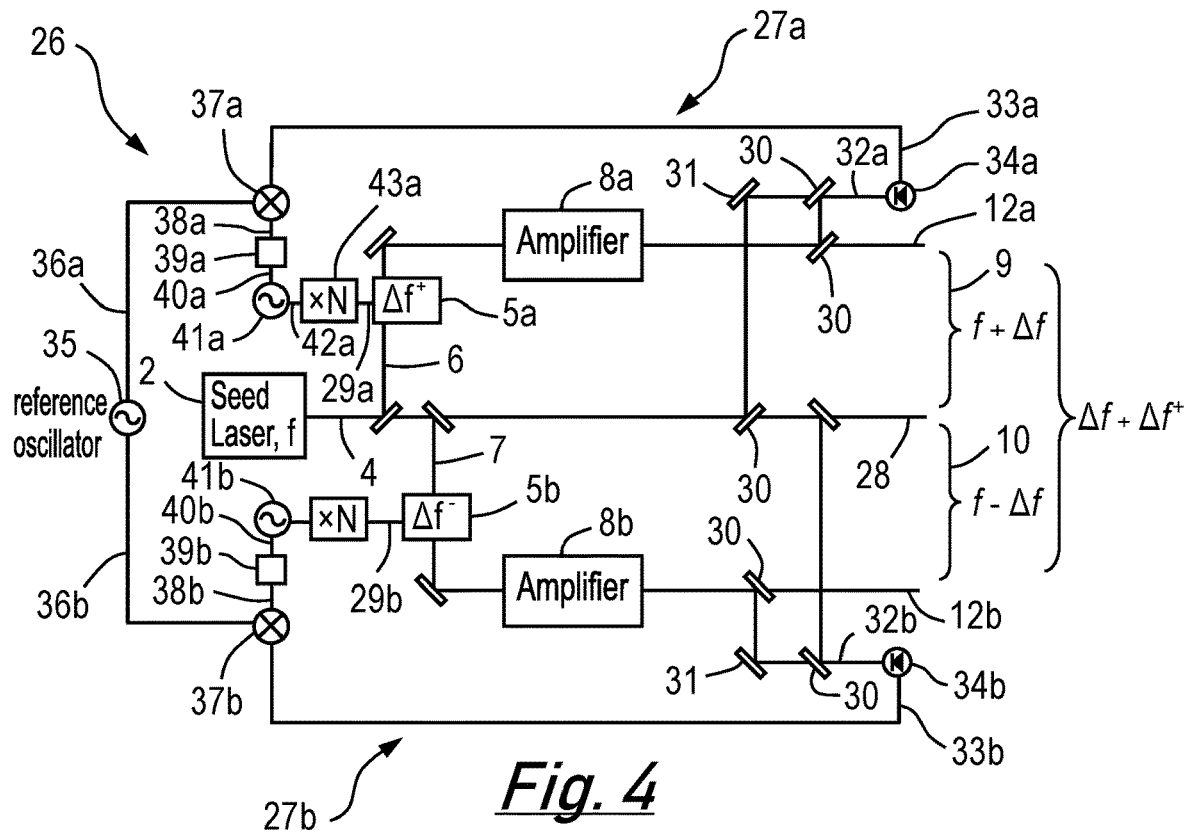
FIG. 4 presents a schematic representation of an injection-locked laser system comprising a phase lock.

FIG. 4 presents a schematic representation of an injection-locked laser system 26 comprising a phase lock control loop 27a and 27b associated with each of the optical amplifiers 8a and 8b.

The injection-locked laser system 26 can again be seen to comprise a first Ti:sapphire laser 2 employed as the master (or seed) laser within the system 26, that is optically pumped by a dedicated continuous wave diode-pumped solid-state (DPSS) laser source 3 to produce the continuous-wave output field 4.

The continuous-wave output field 4 is again split into a first seed optical field 6 and a second seed optical field 7. The first seed optical field 6 is input into an optical amplifier 8a located within the first branch 9 of the injection-locked laser system 26 to generate a first output field 12a. In a similar manner the second seed optical field 7 is input into the optical amplifiers 8b located within the second branch 10 of the injection-locked laser system 26 to generate the second output field, 12b. It should be noted that in this embodiment a fraction of the continuous-wave output field 4 also provides an unshifted third optical output 28 from the injection-locked laser system 26.

In the presently described embodiment, a frequency shift of +Δf is induced upon the first seed optical field 6 injected into the optical amplifiers 8a due to the presence of dedicated optical modulator 5a. In a similar manner, a frequency shift of −Δf is induced upon the first seed optical field 6 injected into the optical amplifiers 8b due to the presence of dedicated optical modulator 5b.

It is again beneficial for the stable operation of the injection-locked laser system 26 to frequency lock the resonance condition of the optical amplifiers 8a and 8b to their respective seed fields 6 and 7, in a similar manner to that described above.

Phase lock control loop 27a is employed to provide a feedback signal 29a for the optical amplifier 8a. It can be seen to comprise three beam splitters 30 and a mirror 31 arranged to combine a fraction of the first output field 12a and the continuous-wave output field 4 to produce a first optical beat signal 32a at the frequency difference Δf between the first output field 12a and the continuous-wave output field 4. The first optical beat signal 32a is then converted to a first electrical beat signal 33a by a first, fast photodetector 34a. The phase lock control loop 27b further comprises a reference oscillator 35 employed to generate a first reference signal 36a having a frequency Δf. The first electrical beat signal 33a and the first reference signal 36a are then supplied to a first frequency mixer 37a located within the phase-lock control loop 27b. The first frequency mixer 37a is employed to mix down the first electrical beat signal 33a and the first reference signal 36a to provide a first error signal 38a that is converted by phase locking electronics 39a to provide a control signal 40a for a first voltage-controlled oscillator (VCO) 41a. An output signal 42a from the VCO 41a is then passed through a first frequency synthesiser 43a which is configured to multiply the output signal 42a from the VCO 41 to produce the desired feedback signal 29a.

The electrical beat signal 33a contains information about the residual phase-noise between the first seed optical field 6 and optical amplifier 8a remaining after injection locking has taken place. The electrical beat signal 33a also contains information about phase-noise introduced within the beam paths the first output field 12a and the third output field 28. The phase lock control loop 27a uses this information to phase lock the frequency offset Δf between the first seed optical field 6 and the output field 12a of optical amplifier 8a and so further suppress the phase noise within the first output field 12a, as well as removing any additional noise introduced during in transmission of the optical fields 4 and 6 within the injection-locked laser system 26.

As can be seen from FIG. 4, the second phase lock control loop 27b is employed in a similar manner to phase lock the frequency offset Δf between the second seed optical field 7 and the output field 12b of optical amplifier 8b to further suppress the phase noise within the second output field 12b, as well as removing any additional noise introduced during in transmission of the optical fields 4 and 7 within the injection-locked laser system 26.

The phase locking mechanism within the injection-locked laser system 26 of FIG. 4 is based on providing feedback to the VCO 41. Injection-locked laser systems 44 and 45, where the phase locking mechanism is based on providing feedback to a voltage-controlled phase shifter 46, will now be discussed with reference to FIGS. 5 and 6.

In these embodiments, a first error signal 38a is generated in a similar manner to that described above with reference to the injection-locked laser system 26 of FIG. 4. However, the first error signal 38a is employed to generate a control signal 40a for a first voltage-controlled phase shifter 46a. The first voltage-controlled phase shifter 46a is also provided with an input signal 47a generated by a first fixed frequency oscillator 48a.

Figure 5:
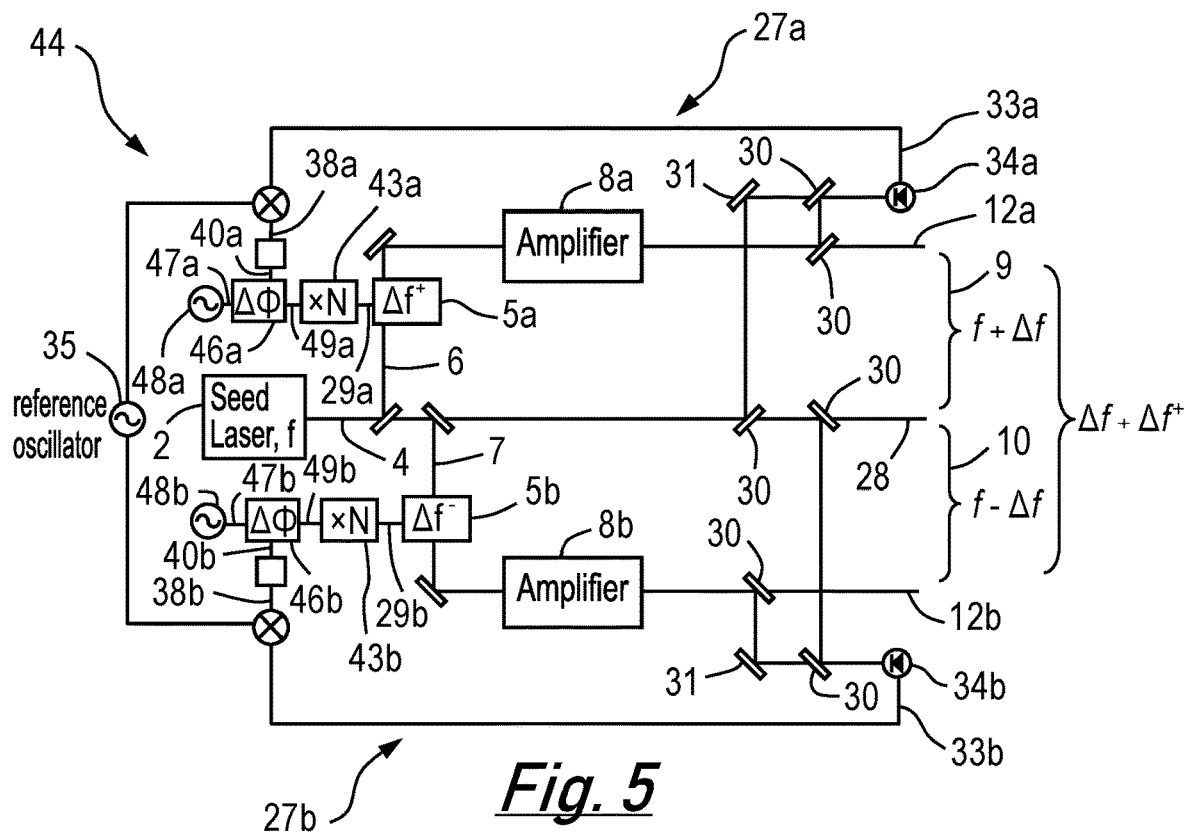
FIG. 5 presents a schematic representation of an injection-locked laser system comprising an alternative phase lock.

In the injection-locked laser system 44 of FIG. 5, an output signal 49a from the first voltage-controlled phase shifter 46a is then passed through a first frequency synthesiser 43a which is configured to multiply the output signal 49a from the first voltage-controlled phase shifter 46a to produce the desired feedback signal 29a.

Figure 6:
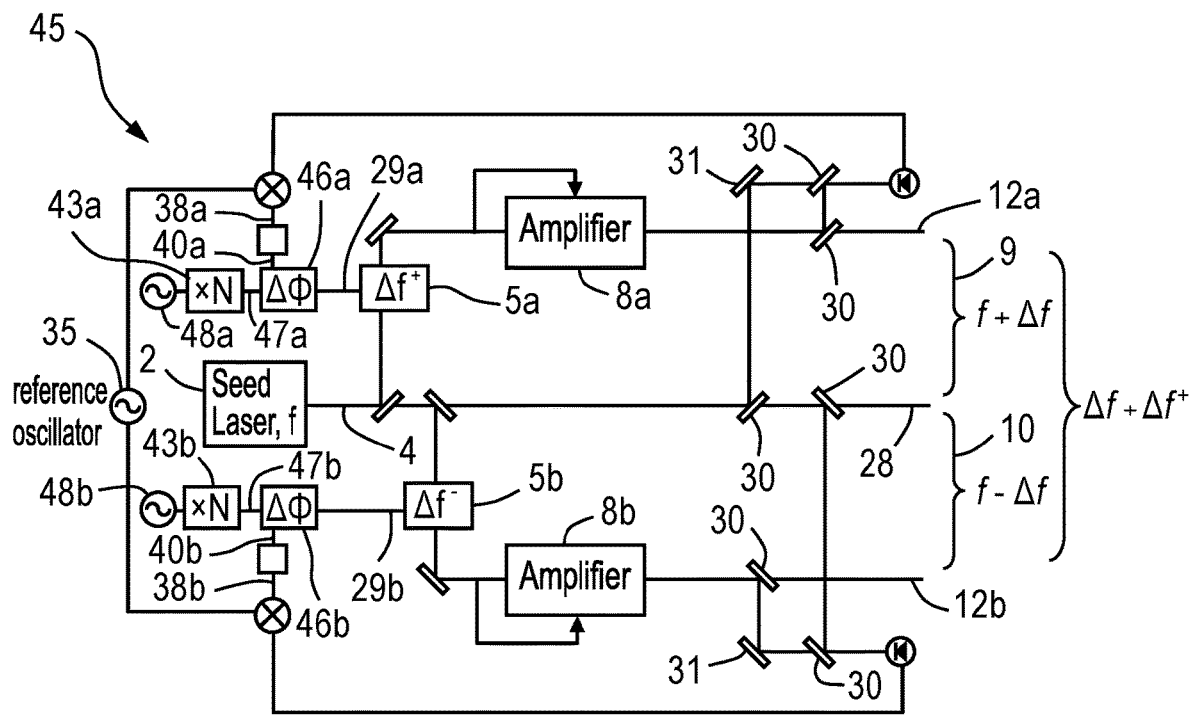
FIG. 6 presents a schematic representation of an injection-locked laser system comprising a second alternative phase lock.

The injection-locked laser system 45 of FIG. 6 differs from that presented within FIG. 5 solely in the positions of the frequency synthesisers 43. In particular, within injection-locked laser systems 45 the frequency synthesisers 43 are configured to multiply the input signals 47 to the voltage-controlled phase shifters 46, instead of the output signals 49 from the first voltage-controlled phase shifters 46, as is the case for injection-locked laser system 44. The injection-locked laser system 44 of FIG. 5 is therefore suited for use with low frequency (~100 MHz) voltage-controlled phase shifters 46 while injection-locked laser system 45 of FIG. 6 is suited for use with microwave voltage-controlled phase shifters 46.

In the injection-locked laser systems 26, 44 and 45, when the phase of the optical fields 12 fluctuate in phase relative to the continuous-wave output field 4 of the master laser 2 then the feedback signals 29 act to change the frequency offset Δf introduced by the optical modulators 5 to automatically compensate for these fluctuations in relative phase. This has the effect of further increasing the phase coherence between the output fields of the injection-locked laser systems 26, 44 and 45.

A further advantage of the above described injection-locked laser systems 26, 44 and 45 is a result of the combined effects on injection locking and phase locking. Injection locking ensures a high degree of phase coherence out to high frequencies which cannot be rivalled by a purely actively controlled system. Additional phase-locking provides a means for further 'cleaning up' of the relative phase noise, especially at low frequencies, which may be residual from the injection lock or introduced in transmission from the system.

It should be noted that the location where the optical beat signals 32 are generated need not be located close to the master laser 2 and the optical amplifiers 8. In alternative embodiments the location where the optical beat signals 32 are generated may be remote from the master laser 2 and the optical amplifiers 8 e.g. at the location where the optical fields generated by the described injection-locked laser systems 26, 44 and 45 are intended to be employed.

Phase Locking with Frequency Chirp

The above described injection-locked laser systems 26, 44 and 45 may be adapted to provide a means to chirp the frequency offset Δf between the continuous-wave output field 4 generated by the master laser 2 and the output field 12 generated by the optical amplifiers 8, that is, to impart a constant change in frequency between the continuous-wave output field 4 and the output field 12 over the same period of time. A schematic representation of such an injection-locked laser system 50 is presented in FIG. 7.

The injection-locked laser system 50 is similar to that presented above with reference to FIG. 4. For ease of understanding only the first branch 9 is presented at this time. The main difference between the injection-locked laser system 50 of FIG. 7 to that presented in FIG. 4 is the fact that the injection-locked laser system 50 employs a composite oscillator 51, rather than a single VCO 41, as the source for generating the feedback signal 29 for the optical modulator 5.

The composite oscillator 51 is formed from a VCO 41 and a direct digital synthesiser (DDS) 52. In this embodiment a first frequency mixer 37a is employed to mix down the electrical beat signal 33 with a first reference signal 36a, generated by reference oscillator 35 operating at frequency $f_A$, typically in the GHz region, to produce an intermediate signal 53 having a frequency $f_B$. A second frequency mixer 37b is then employed to mix down the intermediate signal 53 with a second reference signal 54, generated by DDS 52 operating at a frequency $f_B$, typically in the 10-100 MHz region, to provide the error signal 38 that is converted by phase locking electronics 39 to provide the control signal 40 for the VCO 41. A third frequency mixer 37c is employed to combine the output signal 42 from the VCO 41 with an output signal 55 generated by the DDS 52 to produce the desired feedback signal 29.

The composite oscillator 51 has the advantage that it exhibits both low noise and is agile around the frequency of first reference signal 36a, which is typically of the order of several GHz. Employing the DDS 52 to generate a second reference output signal 55 (typically of the order of MHz) provides a means for employing the DDS 52 to applying a frequency chirp to the output signal 55. As will be appreciated by the skilled reader, when such a frequency chirp is applied to the output signal 55 a corresponding chirp is applied to the frequency mixing process of the third frequency mixer 37c resulting in a chirp being applied to the frequency offset $\Delta f$ between the optical amplifier 8 and the first seed field 6. The optical amplifier 8 being injected with the locked first seed field 6, follows this chirp resulting in a chirp on the frequency of its output field 12 relative to the continuous-wave output field 4, and hence output field 28.

Figure 7:
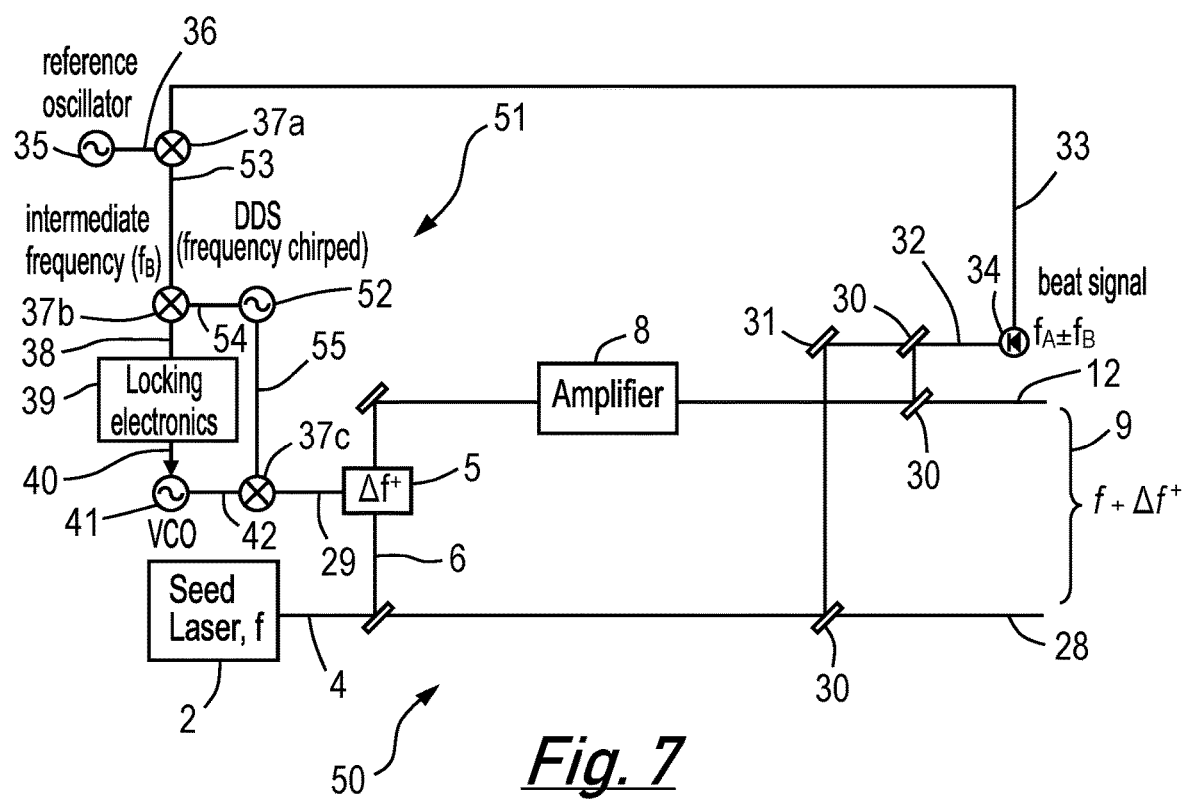
FIG. 7 presents a schematic representation of an injection-locked laser system comprising a phase lock with a frequency chirp.

FIG. 7 presents a single optical amplifier 8 injection locked by the master laser 2 with its output field 12 phase-locked to the continuous-wave output field 4. It will be appreciated that this system could be extended to those previously described where multiple optical amplifier 8 are injection locked and phase-locked to the master laser 2.

In the embodiment present in FIG. 7 the DDS 52 is employed as the source for the second reference signal 54 for the composite oscillator 51 and as the source of the output signal 55 for the third frequency mixer 37c. It will be appreciated that independent DDSs could equally be employed as the source of these two signals.

The embodiment of FIG. 7 also shows the reference oscillator 35 to be a VCO operating at $f_4$. This reference oscillator may equally comprise a VCO operating at a much lower frequency which is then multiplied up by a frequency synthesizer to $f_4$.

The above described technique of phase locking with frequency chirp functionality has been described with reference to the above systems based on a voltage-controlled oscillator (VCO) 41. It will however be appreciated by the skilled reader that in alternative embodiments the techniques may equally be applied to the systems where feedback is to a voltage controlled phase-shifter 46 supplied by a fixed frequency oscillator 48.

The above described injection-locked laser systems provide for a single continuous-wave single master laser to simultaneously injection lock two or more optical amplifiers (slave lasers) thus generating multiple output fields that exhibit high phase-coherence with each other and with the output of the master laser itself.

It will be appreciated by the skilled reader that one or more frequency doubling stages may be incorporated within the injection-locked laser systems 1, 26, 44 and 45 to increase the operating frequencies of the systems. These frequency doubling stages can be located externally i.e. within one or more of the output fields 12 and 28. Where frequency doubling stages are located within the output fields 12 and 28, the pick-off to the photo-detector 34 may be either before or after the frequency doubling stage, i.e. using the fundamental light or the second-harmonic light. The advantage of the latter arrangement is that the phase-lock 27 control loop 27 will also correct for any phase fluctuations introduced by the frequency doubling stages or in transmission from the frequency doubling stages.

The employment of a single frequency master laser to generate a positive and a negative frequency shift within a single optical modulator also has the advantage of ensuring that any noise introduced by the master laser is common to the output of all of the slave lasers of the injection-locked laser system. The use of positive and negative frequency shifts also means that the relative frequency offsets between the output fields of $2\Delta f$ can be achieved by imparting half the frequency shift $+\Delta f$ to a first set of optical amplifiers and the other half $-\Delta f$ to a second set of optical amplifiers. This is advantageous since imparting a large frequency shift $2\Delta f$ on a single optical field can present a significant technical challenge.

The injection-locked laser systems also provide a means of inducing offsets of different magnitudes to the first and second sets of optical amplifiers. This increased control allows for problematic coincident optical resonances within the cavities of the optical amplifiers to be avoided whilst maintaining the same overall frequency offset between the outputs of the optical amplifiers.

A number of phase locked injection-locked laser system have also been disclosed. These systems have the advantage that the phase coherence between the output fields are increased when compared with those systems known in the art. In addition, the phase locked injection-locked laser systems also allow for a chirp on the frequency of the output fields of the optical amplifiers to be introduced relative to the continuous-wave output field of the master laser.

A method and system for injection-locking multiple optical amplifiers is disclosed. A master laser is employed to generate a continuous-wave output field. Optical modulators then produce first and second seed optical fields from the continuous-wave output field. The first and second seed optical fields provide an input to injection lock one or more optical amplifiers, optionally at different operating frequencies. Since the first and second seed optical fields are generated from the continuous-wave output field then the output fields of the optical amplifiers exhibit a high phase-coherence with each other and with the continuous-wave output field. Employing the first and second optical fields reduces the requirement to induce large frequency shifts on a single optical field. Techniques for phase-locking the output of the injection-locked laser systems are also provided to further reduce phase noise within the systems.

Throughout the specification, unless the context demands otherwise, the term "comprise" or "include", or variations such as "comprises" or "comprising", "includes" or "including" will be understood to imply the inclusion of a stated integer or group of integers, but not the exclusion of any other integer or group of integers.

Furthermore, reference to any prior art in the description should not be taken as an indication that the prior art forms part of the common general knowledge.

The foregoing description of the invention has been presented for purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention as defined by the appended claims.

The invention claimed is:

1. An injection-locked laser system (1, 25) comprising:
    a master laser (2) that generates a continuous-wave output field (4) having a frequency ($f_0$);

one or more optical modulators (5, 5a, 5d) employed to produce from the continuous-wave output field (4) a first seed optical field (6) having a first frequency ($f_1$) and a second seed optical field (7) having a second frequency ($f_2$);

wherein the first seed optical field (6) provides an input to injection lock one or more optical amplifiers (8a-c) at the first frequency ($f_1$), the one or more optical amplifiers (8a-c) producing one or more continuous-wave output fields (12a-c) for the injection-locked laser system (1, 25) at the first frequency ($f_1$)

and the second seed optical field (7) provides an input to injection lock one or more optical amplifiers (8d-f) at the second frequency ($f_2$), the one or more optical amplifiers (8d-f) producing one or more continuous-wave output fields (12d-f) for the injection-locked laser system (1, 25) at the second frequency ($f_2$);

the injection-locked laser system (1, 25) further comprising a first phase lock control loop (27a) that provides a first feedback signal (29a) to one of the one or more optical modulators (5, 5a) to phase lock the continuous-wave output field (12a), produced at the first frequency ($f_1$), of a first optical amplifier (8a) to the continuous-wave output field (4) and;

the injection-locked laser system (1, 25) further comprising a second phase lock control loop (27b) that provides a second feedback signal (29b) to one of the one or more optical modulators (5, 5d) to phase lock the continuous-wave output field (12d), produced at the second frequency ($f_2$), of a second optical amplifier (8d) to the continuous-wave output field (4).

2. An injection-locked laser system (25) as claimed in claim 1 wherein the injection-locked laser system (25) comprises N optical modulators employed to produce from the continuous-wave output field (4) N seed optical fields having a frequency ($f_N$).

3. An injection-locked laser system (1, 25) as claimed in claim 1 wherein the first frequency ($f_1$) equals the frequency ($f_0$) of the continuous-wave output field (4) plus a modulation frequency ($\Delta f_1$) introduced by the one or more optical modulators (5, 5a).

4. An injection-locked laser system (1, 25) as claimed in claim 1 wherein the second frequency ($f_2$) equals the frequency ($f_0$) of the continuous-wave output field (4) minus the modulation frequency ($\Delta f_2$) introduced by the one or more optical modulators (5, 5d).

5. An injection-locked laser system (1, 25) as claimed in claim 3 wherein the modulation frequency ($\Delta f$) introduced by the one or more optical modulators (5, 5a, 5d) is between 0.1 and 40 GHz.

6. An injection-locked laser system (1, 25) as claimed in claim 1 wherein the one or more optical modulators (5, 5a, 5d) comprises an electro-optic modulator (EOM) or an acoustic-optic modulator (AOM).

7. An injection-locked laser system (1, 25) as claimed in claim 1 wherein the first seed optical field (6) is mode-matched with the one or more optical amplifiers (8a, 8b, 8c) injection locked by the first seed optical field (6).

8. An injection-locked laser system (1, 25) as claimed in claim 1 wherein the second seed optical field (7) is mode-matched with the one or more optical amplifiers (8d, 8e, 8f), injection locked by the second seed optical field (7).

9. An injection-locked laser system (1, 25) as claimed in claim 1 wherein the injection-locked laser system (1, 25) further comprises one or more frequency lock control loops (13, 19) to frequency lock one or more of the optical amplifiers (8a-c) to the first seed field (6).

10. An injection-locked laser system (1, 25) as claimed in claim 1 wherein the injection-locked laser system (1, 25) further comprises one or more frequency lock control loops (13, 19) to frequency lock one or more of the optical amplifiers (8d-f) to the second seed field (7).

11. An injection-locked laser (1, 25) system as claimed in claim 1 wherein the first phase lock control loop (27a) comprises a first detector (34a) arranged to generate a first electrical beat signal (33a) from a first optical beat signal (32a) generated from the combined output field (12a) of the first optical amplifier (8a) and the continuous-wave output field (4).

12. An injection-locked laser (1, 25) system as claimed in claim 11 wherein the first phase lock control loop (27a) further comprises a reference oscillator (35) employed to generate a first reference signal (36a) having a frequency equal to a frequency of the first electrical beat signal (33a).

13. An injection-locked laser (1, 25) system as claimed in claim 12 wherein the first phase lock control loop (27a) further comprises a first frequency mixer (37a) employed to generate a first error signal (38a) from the first electrical beat signal (33a) and the first reference signal (36a).

14. An injection-locked laser (1, 25) system as claimed in claim 13 wherein the first phase lock control loop (27a) further comprises a first voltage-controlled oscillator (41a) a control signal (40a) for which is generated from the first error signal (38a).

15. An injection-locked laser system (1, 25) as claimed in claim 14 wherein an output signal (42a) from the first voltage-controlled oscillator (41a) provides the feedback signal (29a) for the one of the one or more optical modulators (55a).

16. An injection-locked laser system (1, 25) as claimed in claim 14 wherein the first phase lock control loop (27a) further comprises a first frequency synthesiser (43a) located between the first voltage-controlled oscillator (41a) and the one of the one or more optical modulators (5, 5a).

17. An injection-locked laser system (1, 25) as claimed in claim 14 wherein the first phase lock control loop (27a) further comprises a first voltage-controlled phase shifter (46a) a control signal (40a) for which is generated from the first error signal (38a).

18. An injection-locked laser system (1, 25) as claimed in claim 17 wherein an input signal (47a) for the first voltage-controlled phase shifter (46a) is generated by a first fixed frequency oscillator (48a).

19. An injection-locked laser system (1, 25) as claimed in claim 17 wherein the first phase lock control loop (27a) further comprises a first frequency synthesiser (43a) located between the first voltage-controlled phase shifter (46a) and the one of the one or more optical modulators (5, 5a).

20. An injection-locked laser system (1, 25) as claimed in claim 1 wherein the first phase lock control loop (27a) further comprises a first reference oscillator (35) employed to generate a first reference signal (36a) a having a first frequency $f_A$.

21. An injection-locked laser system (1, 25) as claimed in claim 20 wherein the first phase lock control loop (27a) further comprises a first Direct Digital Synthesiser (DDS) (52) employed to generate a second reference signal (55) a having a second frequency $f_B$.

22. An injection-locked laser system (1, 25) as claimed in claim 21 wherein the first frequency $f_A$ equals the frequency of the first electrical beat signal (33a) minus the second frequency $f_B$.

23. An injection-locked laser system (1, 25) as claimed in claim 20 wherein the first phase lock control loop (27a)

further comprises a first frequency mixer (37*a*) employed to generate a first intermediate frequency signal (53) from the first electrical beat signal (33*a*) and the first reference signal $f_A$.

24. An injection-locked laser system (1, 25) as claimed in claim 23 wherein the first phase lock control loop (27*a*) further comprises a second frequency mixer (37*b*) employed to generate an error signal (38) from the first intermediate frequency signal (53) and the second reference signal $f_B$.

25. An injection-locked laser system (1, 25) as claimed in claim 24 wherein the first phase lock control loop (27*a*) further comprises a first voltage-controlled oscillator (41) a control signal (40) for which is generated from the first error signal (38).

26. An injection-locked laser system (1, 25) as claimed in claim 21 wherein the first Direct Digital Synthesiser (DDS) (52) is further employed to generate an output signal (55).

27. An injection-locked laser system (1, 25) as claimed in claim 26 wherein the first phase lock control loop (27*a*) further comprises a third frequency mixer (37*c*) employed to generate the feedback signal (29) to one of the one or more optical modulators (5, 5*a*) from an output signal (42) from the first voltage-controlled oscillator (41) and the output signal (55) of the first DDS (52).

28. An injection-locked laser system (1, 25) as claimed in claim 1 wherein the injection-locked laser system (1, 25) further comprise one or more frequency doubling stages arranged to frequency double one or more of the output fields the one or more optical amplifiers (8) and or a component of the continuous-wave output field (4).

29. An injection-locked laser system (1, 25) as claimed in claim 28 wherein the first optical beat signals (33*a*) is generated after the one or more frequency doubling stages.

30. A method for injection-locking two or more optical amplifiers (8*a-f*) the method comprising:
    generating a continuous-wave output field (4) having a frequency ($f_0$);
    employing one or more optical modulators (5, 5*a*, 5*d*) to optically modulating the continuous-wave output field (4) to produce a first seed optical field (6) having a first frequency ($f_1$) and a second seed optical field (7) having a second frequency ($f_2$);
    employing the first seed optical field (6) to injection lock one or more optical amplifiers (8*a-c*) at the first frequency ($f_1$)
    employing the one or more optical amplifiers (8*a-c*) to produce one or more continuous-wave output fields (12*a-c*) at the first frequency ($f_1$);
    employing the second seed optical field (7) to injection lock one or more optical amplifiers (8*d-f*) at the second frequency ($f_2$);
    employing the one or more optical amplifiers (8*d-f*) to produce one or more continuous-wave output fields (12*d-f*) at the second frequency ($f_2$);
    employing a first phase lock control loop (27*a*) to provide a first feedback signal (29*a*) to one of the one or more optical modulators (5, 5*a*) to phase lock the continuous-wave output field (12*a*), produced at the first frequency ($f_1$), of a first optical amplifier (8*a*) to the continuous-wave output field (4); and
    employing a second phase lock control loop (27*b*) to provide a second feedback signal (29*b*) to one of the one or more optical modulators (5, 5*d*) to phase lock the continuous-wave output field (12*d*), produced at the second frequency ($f_2$), of a second optical amplifier (8*d*) to the continuous-wave output field (4).

31. A method for injection-locking two or more optical amplifiers (8*a-f*) as claimed in claim 30 wherein the method further comprises mode-matching the first seed optical field (6) with the one or more optical amplifiers (8*a-c*) injection locked by the first seed field (6).

32. A method for injection-locking two or more optical amplifiers (8*a-f*) as claimed in claim 30 wherein the method further comprises mode-matching the second seed optical field (7) with the one or more optical amplifiers (8*d-e*) injection locked by the second seed field (7).

33. A method for injection-locking two or more optical amplifiers (8*a-f*) as claimed in claim 30 wherein the method further comprises frequency locking one or more of the optical amplifiers (8-*c*) to the first seed field (6).

34. A method for injection-locking two or more optical amplifiers (8*a-f*) as claimed in claim 30 wherein the method further comprises frequency locking one or more of the optical amplifiers (8*d-f*) to the second seed field (7).

35. A method for injection-locking two or more optical amplifiers as claimed in claim 30 wherein generating the first feedback signal (29*a*) comprises generating a first optical beat signal (32*a*) from the combined output field (12*a*) of one of the optical amplifiers (8*a*) and the continuous-wave output field (4).

36. A method for injection-locking two or more optical amplifiers (8*a-f*) as claimed in claim 35 wherein generating the first feedback signal (29*a*) further comprises generating a first electrical beat signal (33*a*) from the first optical beat signal (32*a*).

37. A method for injection-locking two or more optical amplifiers (8*a-f*) as claimed in claim 36 wherein generating the first feedback signal (29*a*) further comprises generating a first reference signal (36*a*) having a frequency equal to a frequency of the first electrical beat signal (33*a*).

38. A method for injection-locking two or more optical amplifiers (8*a-f*) as claimed in claim 37 wherein generation of the first feedback signal (29*a*) further comprises generating a first error signal (38*a*) from the first electrical beat signal (33*a*) and the first reference signal (36*a*).

39. A method for injection-locking two or more optical amplifiers (8*a-f*) as claimed in claim 38 wherein generation of the first feedback signal (29*a*) further comprises employing the first error signal (38*a*) to generate a control signal (40*a*) for a first voltage-controlled oscillator (41*a*).

40. A method for injection-locking two or more optical amplifiers (8*a-f*) as claimed in claim 39 wherein an output signal (42*a*) from the first voltage-controlled oscillator (41*a*) provides the first feedback signal (29*a*) for one of the one or more optical modulators (5, 5*a*).

41. A method for injection-locking two or more optical amplifiers (8*a-f*) as claimed in claim 40 wherein the frequency of the first feedback signal (29*a*) is multiplied before arriving at the one of the one or more optical modulators (5, 5*a*).

42. A method for injection-locking two or more optical amplifiers (8*a-f*) as claimed in claim 38 wherein generation of the first feedback signal (29*a*) further comprises employing the first error signal (38*a*) to generate a control signal (40*a*) for a first voltage-controlled phase shifter (46*a*).

43. A method for injection-locking two or more optical amplifiers (8*a-f*) as claimed in claim 42 wherein a first fixed oscillator (48*a*) provides an input signal (47*a*) for the first voltage-controlled phase shifter (46*a*).

44. A method for injection-locking two or more optical amplifiers (8*a-f*) as claimed in claim 43 wherein an output signal (49*a*) from the first voltage-controlled phase shifter (46a) provides the feedback signal (29a) for the one of the one or more optical modulators (5, 5a).

45. A method for injection-locking two or more optical amplifiers (8a-f) as claimed in claim 44 wherein the frequency of the first feedback signal (29a) is multiplied before arriving at the one of the one or more optical modulator (5, 5a).

46. A method for injection-locking two or more optical amplifiers (8a-f) as claimed in claim 43 wherein the frequency of the input signal (47a) is multiplied before arriving at the first voltage-controlled phase shifter (46a).

47. A method for injection-locking two or more optical amplifiers (8a-f) as claimed in claim 38 wherein generating the first feedback signal (29a) further comprises generating a first reference signal (36a) having a frequency $f_A$.

48. A method for injection-locking two or more optical amplifiers (8a-f) as claimed in claim 47 wherein generating the first feedback signal (29a) further comprises generating a second reference signal (55) having a frequency $f_B$.

49. A method for injection-locking two or more optical amplifiers (8a-f) as claimed in claim 48 wherein the first frequency $f_A$ equals the frequency of the first electrical beat (33a) signal minus the second frequency $f_B$.

50. A method for injection-locking two or more optical amplifiers (8a-f) as claimed in claim 48 wherein generating the first feedback signal (29a) further comprises generating a first intermediate frequency signal (53) from the first electrical beat signal (33a) and the first reference signal $f_A$.

51. A method for injection-locking two or more optical amplifiers (8a-f) as claimed in claim 50 wherein generating the first feedback signal (29a) further comprises generating a first error signal (38) from the first intermediate frequency signal (53) and the second reference signal $f_B$.

52. A method for injection-locking two or more optical amplifiers (8a-f) as claimed in claim 51 wherein generating the first feedback signal (29a) further comprises generating a control signal (40) for a first voltage-controlled oscillator (41) from the first error signal (38).

53. A method for injection-locking two or more optical amplifiers (8a-f) as claimed in claim 52 wherein generating the first feedback signal (29a) further comprises frequency mixing an output signal (42) from the first voltage-controlled oscillator (41) and an output signal (55) from a first Direct Digital Synthesiser (DDS) (52).

54. A method for injection-locking two or more optical amplifiers (8a-f) as claimed in claim 30 wherein the method further comprises frequency doubling one or more of the output fields (12a-f) the one or more optical amplifiers (8a-f) and or a component of the continuous-wave output field (4).

55. A method for injection-locking two or more optical amplifiers (8a-f) as claimed in claim 54 wherein the method further comprises generating the first (32a) optical beat signals after frequency doubling the one or more of the output fields (12a-f) of the one or more optical amplifiers (8a-f) and or a component of the continuous-wave output field (4).

* * * * *